(12) United States Patent
Fisher et al.

(10) Patent No.: US 9,292,388 B2
(45) Date of Patent: *Mar. 22, 2016

(54) DETERMINING AND EXTRACTING CHANGED DATA FROM A DATA SOURCE

(71) Applicant: Palantir Technologies Inc., Palo Alto, CA (US)

(72) Inventors: William Fisher, New York, NY (US); Peter Maag, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/581,902

(22) Filed: Dec. 23, 2014

(65) Prior Publication Data
US 2015/0269030 A1   Sep. 24, 2015

Related U.S. Application Data

(63) Continuation of application No. 14/254,773, filed on Apr. 16, 2014, now Pat. No. 8,924,429.

(60) Provisional application No. 61/955,054, filed on Mar. 18, 2014.

(51) Int. Cl.
| | | |
|---|---|---|
| *G06F 17/30* | (2006.01) | |
| *G06F 11/14* | (2006.01) | |
| *G06F 7/24* | (2006.01) | |

(52) U.S. Cl.
CPC .............. *G06F 11/1453* (2013.01); *G06F 7/24* (2013.01); *G06F 17/30* (2013.01); *G06F 17/30156* (2013.01); *G06F 17/30174* (2013.01); *G06F 17/30353* (2013.01); *G06F 17/30386* (2013.01)

(58) Field of Classification Search
CPC ..................... G06F 17/3023; Y10S 707/99954
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |

(Continued)

FOREIGN PATENT DOCUMENTS

| | | |
|---|---|---|
| DE | 10 2014 103 482 | 9/2014 |
| EP | 1 647 908 | 4/2006 |

(Continued)

OTHER PUBLICATIONS

"A Quick Guide to UniProtKB Swiss-Prot & TrEMBL," Sep. 2011, pp. 2.

(Continued)

*Primary Examiner* — Cheryl Lewis
(74) *Attorney, Agent, or Firm* — Knobbe Martens Olson & Bear LLP

(57) ABSTRACT

According to certain aspects, a computer system may be configured to obtain information indicating a plurality of groupings of data stored in a data source, the information indicating a number of data items included in each of the plurality of groupings; determine a first grouping of the plurality of groupings including one or more data items that have changed by comparing a first number of data items included in the first grouping and a historical first number of data items included in a corresponding local version of the first grouping; access data items included in the first grouping from the data source; compare the data items included in the first grouping to data items of the corresponding local version of the first grouping to determine which data items have changed; extract the changed data items of the first grouping; and forward the extracted data items to a destination system.

20 Claims, 7 Drawing Sheets

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Zbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bigham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,085,890 B2 | 8/2006 | Kashyap |
| 7,155,728 B1 | 12/2006 | Prabhu et al. |
| 7,216,133 B2* | 5/2007 | Wu .................. G06F 17/30575 707/620 |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,904,913 B2* | 3/2011 | Sim-Tang et al. ............. 719/318 |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,639,552 B1 | 1/2014 | Chen et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,105,000 B1 | 8/2015 | White et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0193608 A1 | 9/2004 | Gollapudi et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0142949 A1 | 6/2006 | Helt |
| 2006/0209085 A1 | 9/2006 | Wong et al. |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0094312 A1* | 4/2007 | Sim-Tang .................... 707/204 |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0054551 A1 | 2/2013 | Lange |
| 2013/0096968 A1 | 4/2013 | Van Pelt et al. |
| 2013/0198624 A1 | 8/2013 | Aymeloglu et al. |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |

FOREIGN PATENT DOCUMENTS

| | | |
|---|---|---|
| EP | 2 634 745 | 9/2013 |
| EP | 2 743 839 | 6/2014 |
| EP | 2 778 986 | 9/2014 |
| GB | 2 366 498 | 3/2002 |
| GB | 2 508 503 | 6/2014 |
| GB | 2508293 | 4/2015 |
| NZ | 622485 | 3/2015 |
| NZ | 616212 | 5/2015 |
| NZ | 616299 | 7/2015 |

(56) References Cited

FOREIGN PATENT DOCUMENTS

| WO | WO 00/34895 | 6/2000 |
|---|---|---|
| WO | WO 2010/030917 | 3/2010 |
| WO | WO 2013/030595 | 3/2013 |

OTHER PUBLICATIONS

"A Tour of Pinboard," http://pinboard.in/tour as printed May 15, 2014 in 6 pages.

Anonymous, "Frequently Asked Questions about Office Binder 97," http://web.archive.org/web/20100210112922/http://support.microsoft.com/kb/843147 printed Dec. 18, 2006 in 5 pages.

Bae et al., "Partitioning Algorithms for the Computation of Average Iceberg Queries," DaWaK 2000, LNCS 1874, pp. 276-286.

Bogle, Phillip Lee, "Reducing Cross-Domain Call Overheard Using Batched Futures," May 1994, Massachusetts Institute of Technology, pp. 96.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," BioInformatics, vol. 23, No. 6, 2007, pp. 673-679.

Delicious, http://delicious.com/ as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference, New York, 1998, pp. 299-310.

Han et al., "Efficient Computation of Iceberg Cubes with Complex Measures," ACM Sigmod, May 21-24, 2001, pp. 1-12.

Ivanova et al., "An Architecture for Recycling Intermediates in a Column-Store," Proceedings of the 35th Sigmod International Conference on Management of Data, Sigmod '09, Jun. 29, 2009, p. 309.

Kahan et al., "Annotea: An Open RDF Infrastructure for Shared WEB Annotations", Computer Networks, 2002, vol. 39, pp. 589-608.

Karp et al., "A Simple Algorithm for Finding Frequent Elements in Streams and Bags," ACM Transactions on Database Systems, vol. 28, No. 1, Mar. 2003, pp. 51-55.

Kitts, Paul, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

Madden, Tom, "Chapter 16: The BLAST Sequence Analysis Tool," The NCBI Handbook, Oct. 2002, pp. 1-15.

Mendes et al., "TcruziKB: Enabling Complex Queries for Genomic Data Exploration," IEEE International Conference on Semantic Computing, Aug. 2008, pp. 432-439.

Mitzenmacher, Michael, "Compressed Bloom Filters," IEEE/ACM Transactions on Networking, vol. 10, No. 5, Oct. 2002, pp. 604-612.

Mizrachi, Ilene, "Chapter 1: GenBank: The Nuckeotide Sequence Database," The NCBI Handbook, Oct. 2002, pp. 1-14.

Russell et al., "NITELIGHT: A Graphical Tool for Semantic Query Construction," 2008, pp. 10.

Sigrist, et al., "Prosite, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.

"The FASTA Program Package," fasta-36.3.4, Mar. 25, 2011, pp. 29.

Wikipedia, "Machine Code," printed Aug. 11, 2014, pp. 1-5.

Xobni, http://www.xobni.com/, printed Jun. 26, 2014 in 5 pages.

Xobni, "About Page," http://www.xobni.com/about/, printed Jun. 26, 2014 in 2 pages.

U.S. Appl. No. 14/254,757, filed Apr. 16, 2014, Fisher et al., including its ongoing prosecution history, including without limitation Office Actions, Amendments, Remarks, and any other potentially relevant documents.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Bouajjani et al., "Analysis of Recursively Parallel Programs," PLDI09: Proceedings of the 2009 ACM Sigplan Conference on Programming Language Design and Implementation, Jan. 25-27, 2012, Dublin, Ireland, pp. 203-214.

Goldstein et al., "Stacks Lazy Threads: Implementating a Fast Parallel Call," Journal of Parallel and Distributed Computing, Jan. 1, 1996, pp. 5-20.

Jacques, M., "An extensible math expression parser with plug-ins," CODE PROJECT, Mar. 13, 2008. Retrieved on Jan. 30, 2015 from the Internet: http://www.codeproject.com/Articles/7335/An-extensible-math-expression-parser-with-plug-ins.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Stamos et al., "Remote Evaluation," Journal ACM Transactions on Programming Languages and Systems (TOPLAS) vol. 12, Issue 4, Oct. 1990, pp. 537-564.

Wollrath et al., "A Distributed Object Model for the Java System," Proceedings of the 2nd Conference on USENEX, Conference on Object-Oriented Technologies (COOTS), Jun. 17, 1996, pp. 219-231.

Notice of Allowance for U.S. Appl. No. 13/767,779 dated Mar. 17, 2015.

Notice of Allowance for U.S. Appl. No. 14/254,757 dated Sep. 10, 2014.

Notice of Allowance for U.S. Appl. No. 14/254,773 dated Aug. 20, 2014.

Notice of Allowance for U.S. Appl. No. 14/34,741 dated Apr. 7, 2015.

Official Communication for Australian Patent Application No. 2013237658 dated Feb. 2, 2015.

Official Communication for Australian Patent Application No. 2013237710 dated Jan. 16, 2015.

Official Communication for Australian Patent Application No. 2014201580 dated Feb. 27, 2015.

Official Communication for Canadian Patent Application No. 2807899 dated Jul. 20, 2015.

Official Communication for Canadian Patent Application No. 2807899 dated Oct. 24, 2014.

Official Communication for Canadian Patent Application No. 2828264 dated Apr. 28, 2015.

Official Communication for Canadian Patent Application No. 2829266 dated Apr. 28, 2015.

Official Communication for European Patent Application No. 15159520.4 dated Jul. 15, 2015.

Official Communication for German Patent Application No. 10 2013 221 052.3 dated Mar. 24, 2015.

Official Communication for German Patent Application No. 10 2013 221 057.4 dated Mar. 23, 2015.

Official Communication for Great Britian Patent Application No. 1404574.4 dated Dec. 18, 2014.

Official Communication for Netherlands Patent Application No. 2011613 dated Aug. 13, 2015.

Official Communcation for Netherlands Patent Application No. 2011627 dated Aug. 14, 2015.

Official Communication for New Zealand Patent Application No. 616299 dated Jan. 26, 2015.

Official Communication for U.S. Appl. No. 13/411,291 dated Oct. 1, 2015.

(56) References Cited

OTHER PUBLICATIONS

Official Communication for U.S. Appl. No. 13/411,291 dated Jul. 15, 2015.
Official Communication for U.S. Appl. No. 13/608,864 dated Mar. 17, 2015.
Official Communication for U.S. Appl. No. 13/608,864 dated Jun. 8, 2015.
Official Communication for U.S. Appl. No. 13/657,635 dated Mar. 30, 2015.
Official Communication for U.S. Appl. No. 13/657,656 dated May 6, 2015.
Official Communication for U.S. Appl. No. 13/657,656 dated Oct. 7, 2014.
Official Communications for U.S. Appl. No. 13/827,627 dated Mar. 2, 2015.
Official Communication for U.S. Appl. No. 13/827,627 dated Aug. 26, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/304,741 dated Mar. 3, 2015.
Official Communication for U.S. Appl. No. 14/304,741 dated Aug. 6, 2014.
Xobni, "Blog," http://blog.xobni.com/, printed Jun. 26, 2014 in 11 pages.
International Search Report and Written Opinion in Application No. PCT/US2009/056707, dated Mar. 2, 2010.
Official Communication in European Application No. EP 13157474.1 dated May 28, 2013.
Official Communication in Great Britain Application No. 1318667.1 dated Mar. 28, 2014.
Official Communication in New Zealand Application No. 616212 dated Oct. 9, 2013.
Official Communication in New Zealand Application No. 616212 dated May 7, 2014.
Official Communication in Great Britain Application No. 1318666.3 dated Mar. 25, 2014.
Official Communication in European Application No. 14159175.0 dated Jul. 17, 2014.
Official Communication in New Zealand Application No. 622485 dated Nov. 21, 2014.
Official Communication in New Zealand Application No. 622484 dated Apr. 2, 2014.
Official Communication for European Patent Application No. 14159629.6 dated Jul. 31, 2014.
Official Communication for European Patent Application No. 14159629.6 dated Sep. 22, 2014.
Official Communication for New Zealand Patent Application No. 622414 dated Mar. 24, 2014.

* cited by examiner

DETERMINING AND EXTRACTING CHANGED DATA FROM A DATA SOURCE

INCORPORATION BY REFERENCE TO ANY PRIORITY APPLICATIONS

This application is a continuation of U.S. application Ser. No. 14/254,773, filed Apr. 16, 2014, now U.S. Pat. No. 8,924,429 which claims the benefit of U.S. Provisional Application No. 61/955,054, filed Mar. 18, 2014, the entire content of which is incorporated herein by reference. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration and analysis. More specifically, the present disclosure relates to identifying changes in the data of a data source.

BACKGROUND

Organizations and/or companies are producing increasingly large amounts of data. Such data may be stored in different data sources. Data sources may be updated, e.g., periodically.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a computer system configured to obtain changed data from a data source comprises: one or more hardware computer processors configured to execute code in order to cause the system to: obtain information indicating a plurality of groupings of data stored in one or more files or databases in a data source, the information indicating a number of data items included in each of the plurality of groupings; determine a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data; access data items included in the first grouping from the data source; compare the data items included in the first grouping to data items of the corresponding local version of the first grouping to determine which data items of the first grouping from the data source have changed; extract the changed data items of the first grouping; and forward the extracted changed data items to a destination system.

In another embodiment, a method of obtaining changed data from a data source comprises: obtaining, by one or more hardware computer processors, information indicating a plurality of groupings of data stored in one or more files or databases in a data source, the information indicating a number of data items included in each of the plurality of groupings; determining, by the one or more hardware computer processors, a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data; accessing, by the one or more hardware computer processors, data items included in the first grouping from the data source; comparing, by the one or more hardware computer processors, the data items included in the first grouping to data items of the corresponding local version of the first grouping to determine which data items of the first grouping from the data source have changed; extracting, by the one or more hardware computer processors, the changed data items of the first grouping; and forwarding, by the one or more hardware computer processors, the extracted changed data items to a destination system.

In yet another embodiment, a non-transitory computer readable medium comprises instructions for obtaining changed data from a data source that cause a computer processor to: obtain information indicating a plurality of groupings of data stored in one or more files or databases in a data source, the information indicating a number of data items included in each of the plurality of groupings; determine a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data; access data items included in the first grouping from the data source; compare the data items included in the first grouping to data items of the corresponding local version of the first grouping to determine which data items of the first grouping from the data source have changed; extract the changed data items of the first grouping; and forward the extracted changed data items to a destination system.

In some embodiments, a computer system configured to obtain changed data from a data source comprises: one or more hardware computer processors configured to execute code in order to cause the system to: obtain information indicating a plurality of groupings of data of a data source, the information indicating a number of data items included in each of the plurality of groupings; determine a first grouping of the plurality of groupings including one or more data items that have changed by comparing a first number of data items included in the first grouping and a historical number of data items included in each of the plurality of groupings; access data items included in the first grouping from the data source; compare the data items included in the first grouping to data items of a corresponding local version of the first grouping to determine which data items of the first grouping from the data source have changed, wherein the corresponding local version of the first grouping of data items is a compressed version of the first grouping of data items; extract the changed data items of the first grouping; and forward the extracted changed data items to a destination system.

In certain embodiments, a method of obtaining changed data from a data source comprises: obtaining, by one or more hardware computer processors, information indicating a plurality of groupings of data of a data source, the information indicating a number of data items included in each of the plurality of groupings; determining, by the one or more hardware computer processors, a first grouping of the plurality of groupings including one or more data items that have changed by comparing a first number of data items included in the first grouping and a historical number of data items included in each of the plurality of groupings; accessing, by the one or more hardware computer processors, data items included in the first grouping from the data source; comparing, by the one or more hardware computer processors, the data items included in the first grouping to data items of a corresponding local version of the first grouping to determine which data items of the first grouping from the data source have changed, wherein the corresponding local version of the first grouping of data items is a compressed version of the first grouping of data items; extracting, by the one or more hardware computer processors, the changed data items of the first grouping; and forwarding, by the one or more hardware computer processors, the extracted changed data items to a destination system.

In other embodiments, a non-transitory computer readable medium comprises instructions for obtaining changed data from a data source that cause a computer processor to: obtain information indicating a plurality of groupings of data of a data source, the information indicating a number of data items included in each of the plurality of groupings; determine a first grouping of the plurality of groupings including one or more data items that have changed by comparing a first number of data items included in the first grouping and a historical number of data items included in each of the plurality of groupings; access data items included in the first grouping from the data source; compare the data items included in the first grouping to data items of a corresponding local version of the first grouping to determine which data items of the first grouping from the data source have changed, wherein the corresponding local version of the first grouping of data items is a compressed version of the first grouping of data items; extract the changed data items of the first grouping; and forward the extracted changed data items to a destination system.

DETAILED DESCRIPTION

Overview

Figure 1:
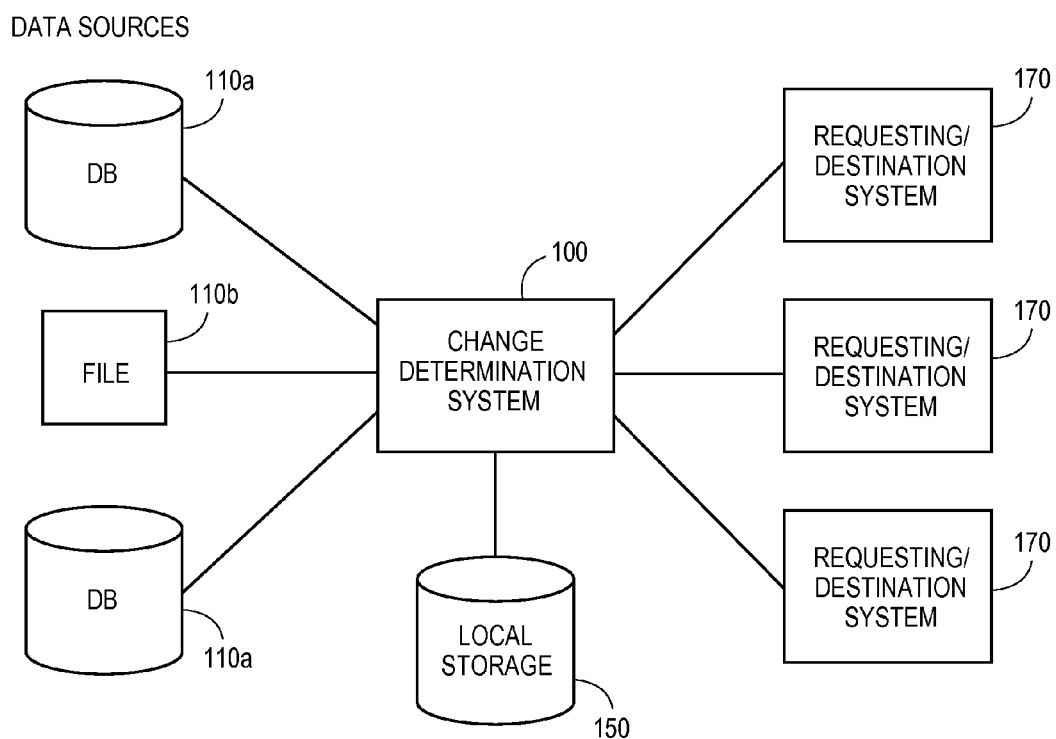
FIG. 1 is a block diagram illustrating one embodiment of a change determination system configured to determine and obtain changes in data of a plurality of data sources.

Organizations may need to obtain data from one or more data sources. Often, data for a particular timeframe is downloaded from a data source. For example, a data source may contain log files, and log files for the past two days may be downloaded. However, some of the data may already have been obtained at a previous time, and the system that is requesting the data may not be able to distinguish between data that it already has and new or changed data that it has not yet been obtained. For instance, the requesting system may simply store the data it downloads each time without considering whether some data is duplicated. Some data may be downloaded again even though it already exists in the system. Accordingly, there is a need for identifying and extracting changed data from a data source in an efficient manner.

As disclosed herein, a change determination system may be configured to identify and obtain changes in data from one or more data sources. For example, the system can determine that there are changes to the data of a data source (e.g., the data for a particular timeframe, such as a day) based on some summary information for a current set of data from the data source (e.g., lines of data associated with a particular day in a previously received data set) compared to a current set of data from the data source (e.g., lines of data associated with the particular day in a current data set). Once pieces of data with changes are identified (e.g., days with different amounts of lines of data), the changed data may be obtained and compared to a local version of the data (or some representation of the data) in order to identify the particular data items (e.g., particular lines of data) that have changed, such that only those particular data items need be provided by the data source.

A data source can be one or more databases and/or one or more files. The actual changes can be forwarded to a destination system for storage. The change determination system can act as an intermediary between data sources and one or more destination systems to identify changed data and forward only the changed data to the destination systems.

It may take a lot of time to download from a data source (e.g., due to slow speed, amount of data, etc.), and re-downloading data that already exists in the destination system can lead to spending unnecessary time and resources. Moreover, saving duplicate data can take up unnecessary storage space in the destination system. By identifying and forwarding only the changed data, the change determination system can provide a way to obtain data from a data source in an intelligent manner and can save time and/or resources for the destination system. This can be very helpful especially when a data source contains large amounts of data, and only a small portion of the data has changed. The change determination system can also identify the changes quickly, for example, by performing a grouping operation on the data explained in detail below.

Change Determination System

FIG. 1 is a block diagram illustrating one embodiment of a change determination system 100 configured to determine and obtain changes in data of a plurality of data sources 110. A data source 110 can include one or more databases 110a, one or more files 110b (e.g., flat file or file system), any other type of data structure, or a combination of multiple data structures. Data in the database 110a may be organized into one or more tables, which include rows and columns. Data in the file 110b may be organized as lines with various fields. For example, a file 110b may be in CSV format. Data in files, databases, or other data structure, may be referred to in terms of "lines," where a line is a subset of the file. For example, lines of a file may be groups of data between newline markers or divisions of text of the file into predetermined size groups (e.g., each line includes 255 characters) and lines of a database may be a row or some other subset of information in the database. Data in a database 110a and a file 110b may be handled or processed in a similar manner by the change determination system ("CDS") 100. In certain embodiments, the CDS 100 obtains changes from a single data source 110, instead of multiple data sources 110.

The CDS 100 may include one or more components (not shown) that perform functions relating to determining and obtaining changes in the data of data sources 110. The CDS 100 may also include local storage 150, which can store any local version of the data in a data source 110, such as a summarized and/or compressed version of the data. The local version of the data can be used to identify the actual changes in the data of the data source 210 and/or portions of the data (e.g., lines of the data) that include changes. The local version may include some or all of the data of a data source, depending on the embodiment.

One or more destination systems 270 may request changed data from the CDS 100. The destination systems 270 may send a request on a periodic basis (e.g., scheduled), on demand, etc. The CDS 100 may also periodically check a data source(s) 210 and forward any changes without receiving a request from a destination system 270. For example, the CDS 100 may be scheduled to check the data sources 210 every 2 hours. Such a schedule may be defined as one or more policies. In one embodiment, a destination system 270 includes the CDS 100, such that the functionality described herein with reference to the CDS 100 may be performed by the destination system 270 itself.

Figure 2A:
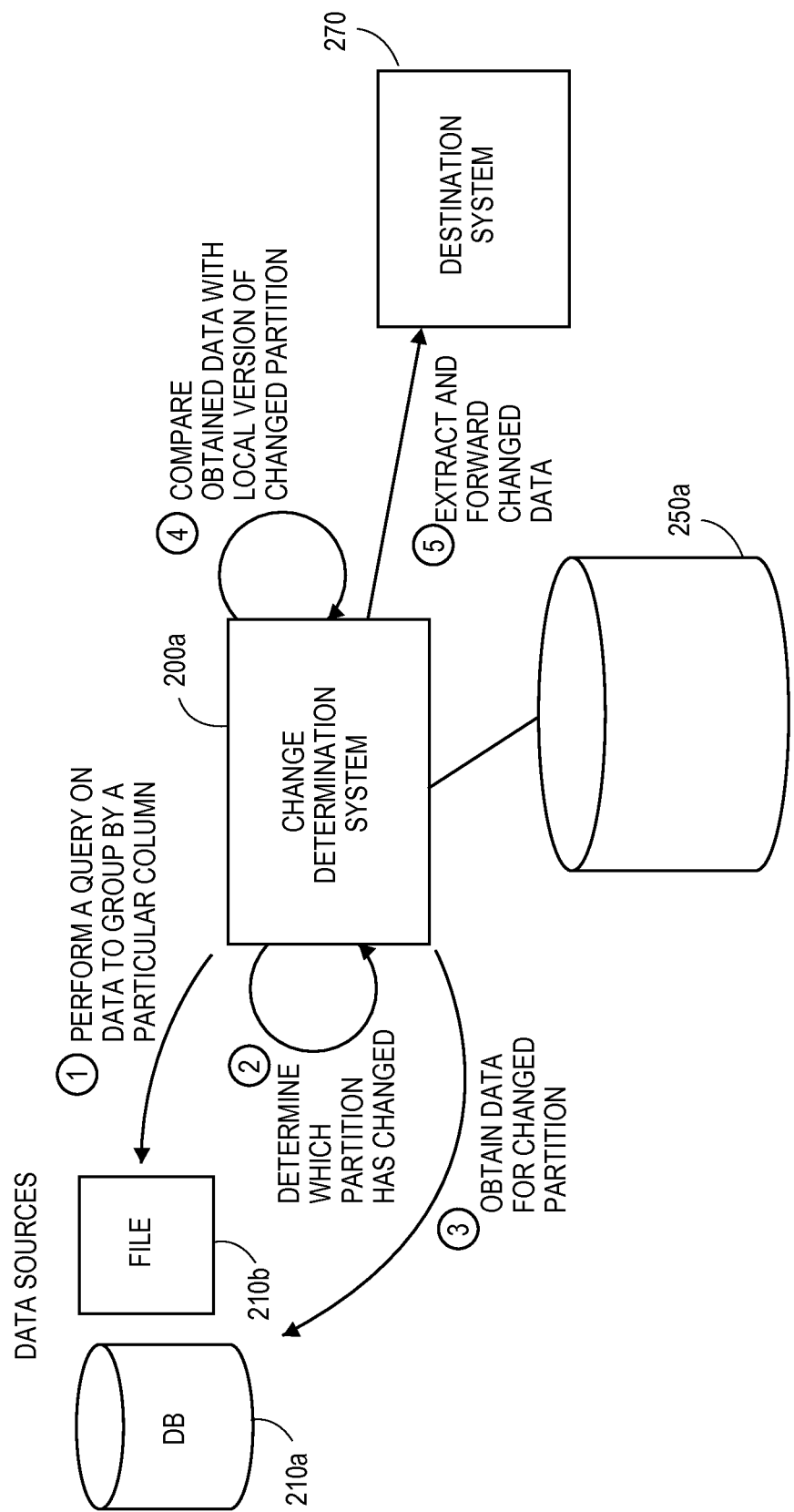
FIG. 2A is a data flow diagram illustrative of the interaction between the various components of a change determination system configured to determine and obtain changes in data of a plurality of data sources, according to one embodiment.

FIG. 2A is a data flow diagram illustrative of the interaction between the various components of a change determination system 200a configured to determine and obtain changes in data of a plurality of data sources, according to one embodiment. The CDS 200a and corresponding components of FIG. 2A may be similar to or the same as the CDS 100 and similarly named components of FIG. 1.

At data flow action 1, the CDS 200a performs a query on the data in a data source 210 to group by a particular attribute, such as a column of information in a table. For purposes of discussion herein, many examples are discussed with reference to grouping based on one or more "columns," where each column is associated with a particular attribute. In other embodiments, attributes may be associated with different display features of a data structure (e.g., besides columns). For example, if the data source 210 is a database 210a, the CDS 200a can perform an SQL query and group by a particular column in a table, e.g., by using the GROUP BY clause, which is used in SQL to group rows having common values into a smaller set of rows. The smaller sets of rows may be referred to as partitions or groups. Each partition includes rows that have the same value for the designated column. GROUP BY is often used in conjunction with SQL aggregation functions or to eliminate duplicate rows from a result set.

The column that is designated as the column for GROUP BY should be able to provide some indication of which rows are new or changed from the previous time the CDS 200a obtained data from the data source 210. In one example, a table in the database 210a includes a last updated column, which includes a timestamp for when the data in the row was last updated, and the data in the database 210a can be grouped by the last updated column. Since the timestamp can include the hour, minute, second, etc. in addition to the date, only the date of the timestamp might be used for GROUP BY. In such case, a partition would be based on a day, and each partition would contain the rows for each day. An aggregate function such as COUNT can be applied to the results of GROUP BY in order to obtain the number of rows for each partition. The results of the query from the data source 210 can include one or more partitions from the GROUP BY and the number of rows included in each partition. The CDS 200a may store the results or keep track of the results locally so that the results can be compared the next time the CDS 200a requests this type of information from the data source 210.

Data from a file data source 210b may also be queried in a similar manner. The CDS 200a may use different adapters to access data residing in one or more databases 210a and data residing in one or more files 210b, but once the data is obtained, it can be handled in the same manner by the CDS 200a, regardless of whether the data source is in the form of a database 210a or a file 210b. The details discussed with respect to a database data source 210a can be generalized to other types of data sources 210, including a file data source 210b. For example, a partition can refer to a grouping used on a text (or other field type) resulting from an operation that is similar to SQL GROUP BY. A partition may also be referred to as a "grouping." A grouping may include data from a database 210a or a file 210b. A unit of data included in a grouping may be referred as a "data item." A data item may be a row in case of a database 210a or a line in case of a file 210b. The column or field to group by can be any type that can provide partitions of appropriate size for comparison (e.g., provide uneven or non-uniform distribution). Some details relating to the group by column/field are explained further below.

At data flow action 2, the CDS 200a determines which partition(s) have changed. The number of rows for the partitions obtained at data flow action 1 may be compared to the number of rows for corresponding partitions obtained at a previous time. The current number of rows in partitions may be referred to as "current grouping data," and the number of rows for various partitions from a previous time may be referred to as "historical grouping data." The CDS 200a can compare the current grouping data against the historical grouping data to determine whether the number of rows for a particular partition changed. For example, if the number of rows for Day 1 is 1,000 in the historical grouping data, but the number of rows for Day 1 is 1,050 in the current grouping data, the partition for Day 1 is a candidate for checking whether the actual data changed. It is likely that 50 new rows were added for Day 1, and the CDS 200a can determine which rows of 1,050 are new and extract them to forward to a destination system 270. In this manner, the CDS 200a may identify one or more partitions that have changed.

At data flow action 3, the CDS 200a obtains data for any identified changed partition(s). In particular, once the CDS 200a identifies a changed partition, the CDS 200a obtains the data for the particular partition from the data source 210. In the example above, the CDS 200a requests the 1,050 rows for Day 1. The CDS 200a can store the 1,050 rows locally, e.g., in local storage 250a. The 1,050 rows can then be used for comparison the next time the data for this partition is changed.

At data flow action 4, the CDS 200a compares the obtained data with the local version of the changed partition. The CDS 200a can compare the downloaded data against a corresponding local version of the data. For example, the CDS 200a may have stored the 1,000 rows for Day 1 from a previous time in local storage 250a. The data for the partition from a previous time may be referred to as "historical partition data." Similarly, the current data for the partition may be referred to as "current partition data." The local version of the data may include data for one partition or a number of partitions. By comparing the 1,050 current rows for Day 1 in the current partition data to the 1,000 previous rows for Day 1 in the historical partition data, the CDS 200*a* may identify which 50 rows have changed. These 50 rows can be flagged or put in a file so that they can be sent to any relevant destination system 270.

At data flow action 5, the CDS 200*a* forwards the changed data to the destination system 270. As explained above, the changed data may be extracted from the current partition data, saved to a file, and sent to the destination system 270. The destination system 270 may then store the received data in its storage device(s) without having to check whether any duplicate exists in the received data. Because the CDS 210*a* can send the exact changed data, the destination system 270 can simply store what it receives from the CDS 210*a* and does not need to implement much functionality at its end.

In FIG. 2A, in order to compare the current partition data to the historical partition data, the CDS 200*a* may locally maintain all or a subset of the data from a data source 210. However, in some cases, the local storage 250*a* may have limited storage space, and the CDS 200*a* may not be able to store all of the data used in the comparison. Accordingly, in such cases, the CDS 200*a* may maintain a compressed version of the data from a data source 210 for comparison. In some embodiments, the compressed version of the data can be one or more Bloom filters. Such embodiments are described in further detail in connection with FIG. 2B.

Figure 2B:
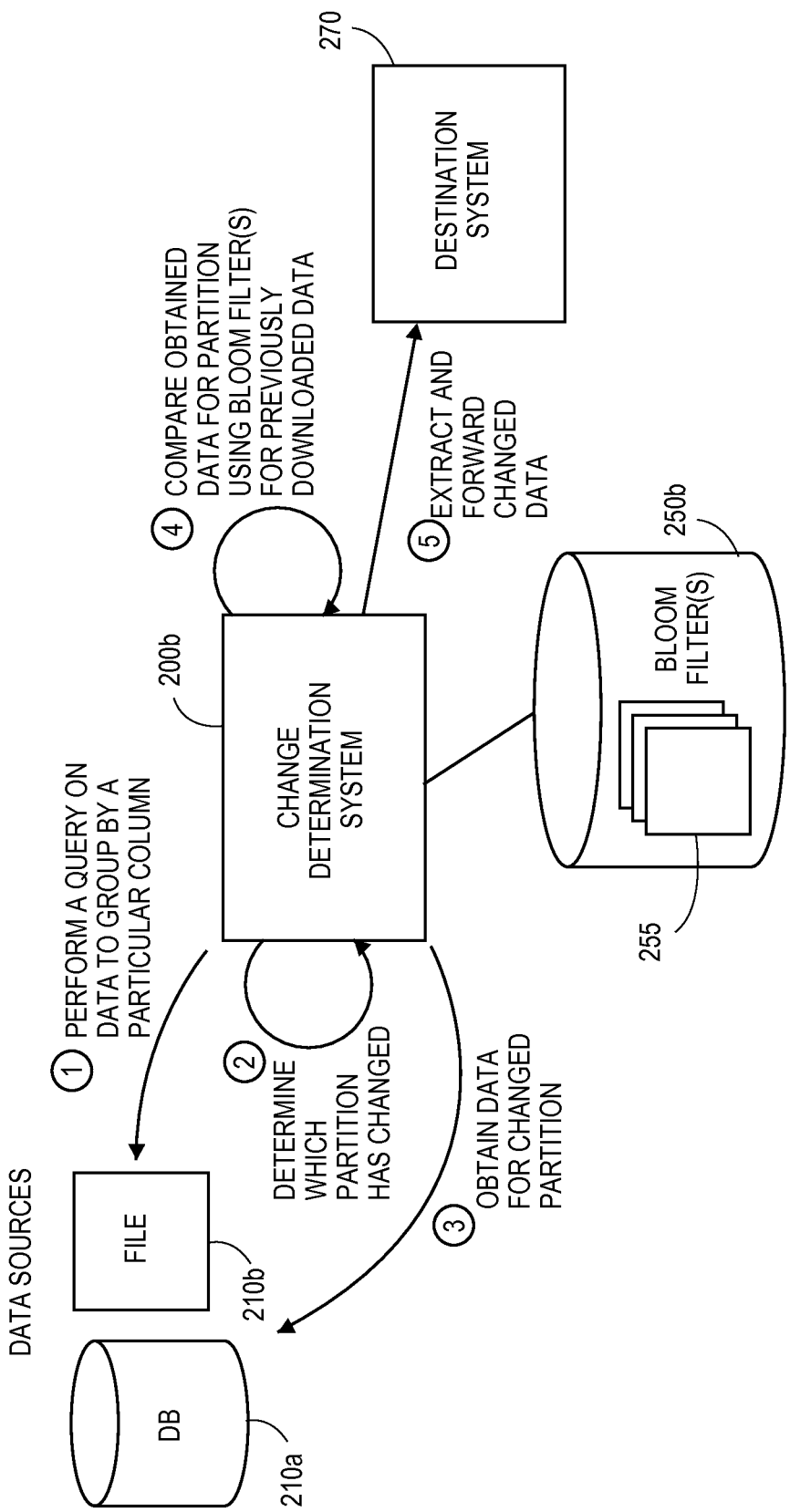
FIG. 2B is a data flow diagram illustrative of the interaction between the various components of a change determination system configured to determine and obtain changes in data of a plurality of data sources, according to another embodiment.

FIG. 2B is a data flow diagram illustrative of the interaction between the various components of a change determination system 200*b* configured to determine and obtain changes in data of a plurality of data sources, according to another embodiment. The CDS 200*b* and corresponding components of FIG. 2B may be similar to or the same as the CDS 100, 200*a* and similarly named components of Figures and 2A.

Data flow actions 1-5 can be similar to data flow actions 1-5 in FIG. 2A. Certain details relating to the CDS 200*b* are explained above in more detail in connection with FIG. 2A. In general, though, at data flow action 1, the CDS 200*b* performs a query on the data in a data source 210 to group by a particular column. At data flow action 2, the CDS 200*b* determines which partition has changed. At data flow action 3, the CDS 200*b* obtains data for the changed partition.

As explained above, a Bloom filter(s) can be used in comparison of the current partition data and the historical partition data. A Bloom filter may refer to a space-efficient probabilistic data structure that is used to test whether an element is a member of a set (e.g., data items are part of a partition). False positive matches are possible, but false negatives are not. For example, a query can return either "possibly in set" or "definitely not in set." Elements can be added to the set, but generally cannot be removed. As more elements are added to the set, the probability of false positives becomes larger.

In one embodiment, a Bloom filter used by the CDS 200*b* is a bit array of m bits and has k different hash functions that are used to add an element to the Bloom filter. In order to add an element to the Bloom filter, an element is fed to each of the k hash functions to get k array positions. The bits at these k positions are set to 1. In order to query for an element to determine whether it is in the set, the element is fed to each of the k hash functions to get the k array positions. If any of the bits at these positions is 0, the element is definitely not in the set. If all of the bits at these positions are 1, the element is either in the set, or the bits were set to 1 by chance when adding other elements. If the bits were set to 1 by chance, this can lead to a false positive. The Bloom filter is not required to store the elements themselves.

Although a risk of false positives exists, Bloom filters can provide a strong space advantage over other data structures for representing sets, such as self-balancing binary search trees, hash tables, simple arrays, linked lists, etc. Other data structures may require storing at least the data items themselves, which can require anywhere from a small number of bits (e.g., for small integers) to an arbitrary number of bits (e.g., for strings). On the other hand, a Bloom filter with 1% error and an optimal value of k may require only about 9.6 bits per element (e.g., data item), regardless of the size of the elements. The space advantage can be partly due to the compactness of the Bloom filter, inherited from arrays, and partly due to the probabilistic nature of the Bloom filter. The 1% false-positive rate can be reduced by a factor of ten by adding only about 4.8 bits per element.

At data flow action 4, the CDS 200*b* compares the current partition data to historical partition data using one or more Bloom filters 255. One or more Bloom filters 255 may be stored in local storage 250*b*. A Bloom filter can be created for the local version of the data. For example, at the time of a previous download, the CDS 200*b* may have added the data items from the data source 210 to a Bloom filter. Although the Bloom filter does not store the actual data items (e.g., the actual data items can be deleted after corresponding Bloom filters are generated), it can determine with high probability whether a data item is included in the previous version of the data or not. The Bloom filter can take up much less space than storing the historical or current partition data and can serve as a compressed version of the data. For each data item included in the current partition data, the CDS 200*b* can query the Bloom filter that includes the corresponding historical partition data to check whether the data item was included in the historical partition data or if it is new. In one embodiment, if n number of hash functions are defined for the Bloom filter, the Bloom filter applies the n hash functions to the data item to return n number of array positions. If any of the array positions is 0, the data item was not included in the historical partition data. If all array positions are 1, the data item was likely included in the historical partition data, although a small probability of false positive exists.

Partition data obtained from a data source 210 may include a number of individual data items (e.g., rows, lines, etc.), and the actual number of data items included in the data of a partition can vary; some partitions may include a small number of data items, and other partitions can include a large number of data items. In one embodiment, the size of a Bloom filter is predetermined, and it may not be optimal to use the same Bloom filter for a small amount of data and a large amount of data. The probability of the Bloom filter returning false positives increases with the number of elements added to the Bloom filter. Therefore, if too many elements are added, the Bloom filter may become saturated, and the accuracy of the Bloom filter can deteriorate, e.g., to a point of returning almost 100% false positives. Accordingly, Bloom filters of different sizes can be used to accommodate data of varying size. For example, a Bloom filter has a predetermined size of m bits when it is created and may not be able to accommodate data that includes more than a specific number of elements (e.g., x number of elements) without deterioration of accuracy. For data that includes more than x elements, a Bloom filter having a size larger than m bits can be used. Because the size of data from different data sources can vary, the CDS 200*b* may use a series of Bloom filters of increasing size in order to accommodate different data size. For instance, the CDS 200*b* may have a number of Bloom filters of varying sizes available for use, or may create one as needed. In one example, the CDS 200*b* may begin with a Bloom filter having a size of m bits, and if this Bloom filter is too small for the data, the CDS 200*b* may select or create a Bloom filter having a size of m+y bits and so on until the CDS 200*b* finds a Bloom filter having the right size for the data. The data from various data sources 210 may share the same set of Bloom filters. Or in certain embodiments, the CDS 200*b* may keep Bloom filters for different data sources 210 separate from each other.

In one embodiment, the CDS 200*b* may store Bloom filters 255 on storage that provides high accessibility. For example, the local storage 250*b* can include storage that is a type which is more accessible than storage used by a destination system 270. For example, the local storage 250*b* can use Network Attached Storage (NAS) since it is very accessible to attached devices. A more accessible storage type may be more expensive than less accessible storage type, and since Bloom filters can save space, the CDS 200*b* can reduce costs associated with the local storage 250*b*.

At data flow action 5, the CDS 200*b* extracts and forwards the changed data to the destination system 270. This step can be similar to data flow action 5 of FIG. 2A. The CDS 200*b* can forward the changed data to one or more destination systems 270.

Figure 3:
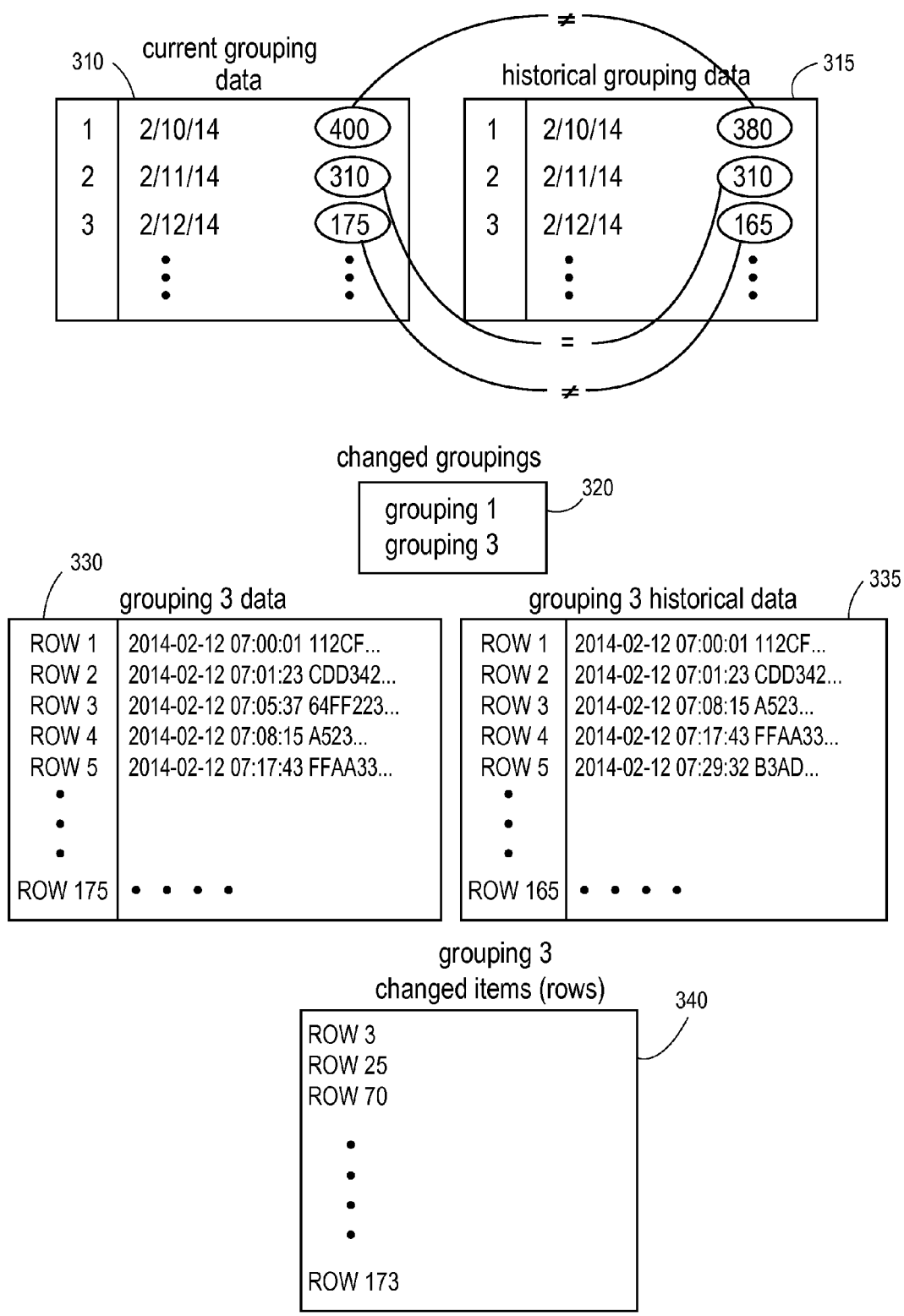
FIG. 3 is an example of information obtained from a data source and/or information processed by the change determination system.

FIG. 3 is an example of information obtained from a data source and/or information processed by the change determination system. A specific, illustrative example will be explained with respect to FIG. 3. Various aspects will be explained with reference to the CDS 200*a* in FIG. 2A, but the example can also apply to the CDS 100, 200*b* of FIGS. 1 and 2B. The example will refer to data of a data source 210 at time T0 and data of the data source 210 at time T1, where T0 is earlier than T1.

At time T1, the CDS 200*a* performs a query on the data of the data source 210 to group the data by the last changed or updated column or field. The data can be grouped into one or more groupings based on the date. The data source 210 can return a result that includes groupings 310 organized by date. The result can be referred to as "current grouping data." The current grouping data 310 may list the date for a grouping and the number of data items included in that grouping. The current grouping data 310 shows that Grouping 1 is for 2/10/14, and the number of data items in Grouping 1 is 400; Grouping 2 is for 2/11/14, and the number of data items in Grouping 2 is 310; and Grouping 3 is for 2/12/14, and the number of data items in Grouping 3 is 175.

The CDS 200*a* compares the current grouping data 310 to historical grouping data 315. Historical grouping data 315 can include the grouping data obtained from the data source 210 at various times in the past. Historical grouping data 315 can include grouping data for one or more days. In FIG. 3, the historical grouping data 315 shows the grouping data at T0. The historical grouping data 315 shows that Grouping 1 is for 2/10/14, and the number of data items in Grouping 1 is 380; Grouping 2 is for 2/11/14, and the number of data items in Grouping 2 is 310; and Grouping 3 is for 2/12/14, and the number of data items in Grouping 3 is 165.

By comparing the number of data items in the same groupings at different points in time, the CDS 200 can identify that certain groupings have changed or are potential candidates having changed data items. The number of data items for Grouping 1 at T1 is 400, and the number of data items for Grouping 1 at T0 is 380. The number of data items for Grouping 2 at T1 is 310, and the number of data items for Grouping 2 at T0 is 310. The number of data items for Grouping 3 at T1 is 175, and the number of data items for Grouping 3 at T0 is 165. The CDS 200*a* can see that the number of data items in Groupings 1 and 3 changed from T0 to T1, while the number of data items in Grouping 2 remained the same from T0 to T1. From this comparison, the CDS 200*a* can determine that data for Grouping 1 and Grouping 3 may have changed and should be obtained from the data source 210. The CDS 200*a* may keep track of the changed groupings 320, e.g., to request data from these groupings from the data source 210. For example, the changed groupings 320 information can list Groupings 1 and 3.

The CDS 200*a* obtains the data for Grouping 1 from the data source 210, and also obtains the data for Grouping 3 from the data source 210 (or some summary of the groupings, such as Bloom filters, in other embodiments). The example will be further explained with the obtained Grouping 3 data 330. Grouping 3 data 330 includes all 175 data items included in the grouping. The data source 210 can be a database 210*a*, and Grouping 3 data 330 may include rows as data items. Each row in Grouping 3 data 330 can include the date and time for the row (e.g., the timestamp of the last updated column) and the data of that row.

The CDS 200*a* compares Grouping 3 data 330 against Grouping 3 historical data 335. Grouping 3 data 330 can be associated with T1, and Grouping 3 historical data 335 can be associated with T0. For example, Grouping 3 historical data 335 can be Grouping 3 data that was obtained at T0. Grouping 3 historical data may also include rows as data items. Each row in Grouping 3 historical data 335 can also include the date and time for the row and the data of that row. By comparing Grouping 3 data 330 and Grouping 3 historical data 335, the CDS 200*a* can determine that Row 3 changed, for example, Row 3 may have been inserted after T0. The CDS 200*a* flags Row 3 as a data item to send to a destination system 270. By going through the rest of Grouping 3 data 330 and Grouping 3 historical data 335, the CDS 200*a* identifies 10 rows in this example that were added. The CDS 200*a* can keep track of the changed data items in a list, such as Grouping 3 changed items list 340. In some embodiments, instead of comparing the data items to the previous version of the data items, the CDS 200*a* uses a Bloom filter to which the data items in the previous version have been added. The CDS 200*a* queries the Bloom filter to determine if a data item is in the set.

The CDS 200*a* may obtain grouping information for all dates for which data is available in the data source 210. For example, a data source 210 contains data for 1,000 days, the CDS 200*a* can get the grouping information for all 1,000 days. Or the CDS 200*a* may specify a timeframe for which it wants to obtain grouping information, such as 60 days. Grouping information can be easily obtained from a data source 210 without placing a burden on the resources of the data source 210. By comparing to historical grouping information, the CDS 200*a* can easily identify which groupings may have changed data.

Because comparison of grouping information can make it easy to spot changed data over a long period of time, the CDS 200*a* can capture all of the changes in the data. For example, in a system that downloads data for last 5 days may miss any data items whose last updated timestamp has changed to fall outside this 5-day window. However, the CDS 200*a* can detect that a data item has been removed or added to a particular grouping in any time window. For example, a user accidentally changes the last updated timestamp for Row 1 to Day 1 of Day 1,000. The system that only downloads last 5 days of data will miss Row 1, but the CDS 200*a* will recognize Row 1 as a change because it will be reflected in the number of data items for Day 1 in the grouping information.

The grouping unit or size and the grouping column can be selected such that most of the new data added to the data source 210 falls into one of the grouping units. In one embodiment, the grouping unit or size can relate to the desired latency of the pipeline, and the grouping column can relate to the distribution. The grouping unit or size may be selected at different levels of granularity. For example, a grouping may be based on a unit of multiple days, a day, multiple hours, an hour, etc. The unit or size of a grouping can be selected as appropriate, e.g., based on the requirements of the data source 210, CDS 200a, and/or the destination system 270. The unit or size of a grouping can be specified at a level that provides a meaningful comparison of groupings. In some embodiments, the grouping unit that leads to an even distribution of data items into groupings may not be very helpful since each grouping will have a change to the number of data items, and the CDS 200a has to check almost all groupings. For example, if GROUP BY was by an hour, instead of a day, the partition for each hour will probably include a few rows, and almost all partitions would have to be checked, which can lead to obtaining data for most of the partitions. On the other hand, GROUP BY by a day will probably lead to recently added data falling into the more recent partitions. Under similar reasoning, the column or field used for grouping by can have a characteristic that leads to more "skewed" distribution than even distribution. In one example, if the data items were grouped by first letter of a person's last name, the grouping for each alphabet letter will likely contain new data items, and groupings for all alphabet letters will have to be checked. In other embodiments, even distribution of data items may be desired, and accordingly, the grouping unit or size and the grouping column can be selected to provide an even distribution of data items. For example, this may be done such that most of data items to be processed are not placed into one grouping.

In the example where the data is grouped by the last updated column, the CDS 200a may not distinguish between a data item that has been added and an existing data item that has been updated. In certain embodiments, the CDS 200a may implement a way to distinguish between the two types of change. For example, each data item may be assigned a unique identifier, e.g., when the data item is stored locally in local storage 250a. The unique identifier can be used to track whether a data item has been updated. In this case, the CDS 200a may not be able to use Bloom filters since actual data is not stored in Bloom filters.

In some embodiments, the CDS 200a may recognize that some data items have been deleted. For instance, the number of data items for a grouping may have decreased in comparison the previous number of data items for that grouping. The CDS 200a can identify the deleted data by comparing the data for the grouping to the local version of the data for the grouping. The CDS 200a may send information to the destination system 270 that the identified data items have been deleted, and the destination system 270 can delete the data items from its storage based on the information sent by the CDS 200a.

As described above, the CDS 200a can offer many advantages. The CDS 200a can identify a changed subset of data in a data source 210 without downloading all of the data. The CDS 200a can do so for large amounts, which can be very efficient. Only a portion of the data that may include changes is downloaded to extract the actual change. The CDS 200a can also identify changes in a generic way and can work with various data sources 210. Often, the CDS 200a may not have any information about the data of a data source 210. For example, the CDS 200a may not know how the data is structured (e.g., database schema, file format, etc.), how frequently the data is updated, ways in which the data is updated, or how the data is updated. The CDS 200a may identify a column such as the last updated column that can indicate whether a data item might be new and proceed to identify changes by performing a group by on the selected column. The CDS 200a may also handle data in different formats, such as databases and files, in the same or a similar manner. Because the CDS 200a only obtains or grabs changed data from a data source 210 to send to a destination system 270, the CDS 200a may also be referred to as a "grabber."

Figure 4A:
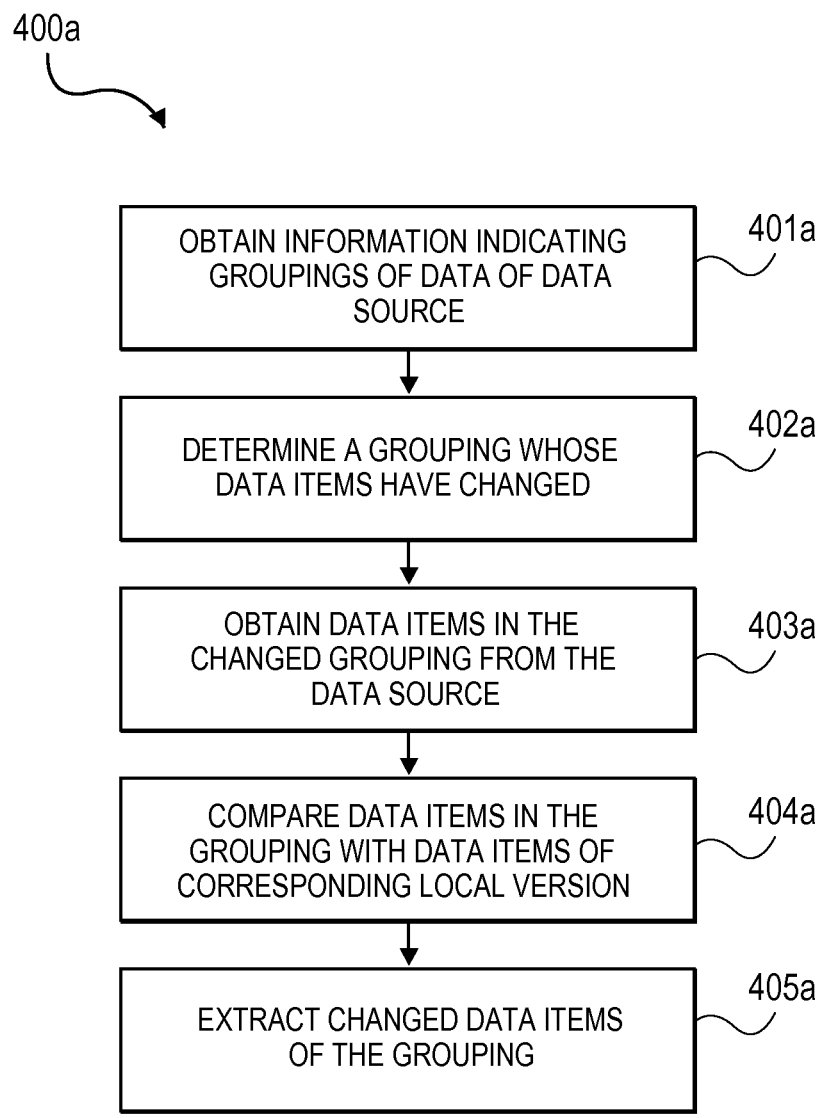
FIG. 4A is a flowchart illustrating one embodiment of a process for determining and obtaining changes in data of a plurality of data sources.

FIG. 4A is a flowchart illustrating one embodiment of a process 400a for determining and obtaining changes in data of a plurality of data sources. The process 400a may be implemented by one or more systems described with respect to FIGS. 1-2 and 5. For illustrative purposes, the process 400a is explained below in connection with the CDS 200a in FIG. 2A. Certain details relating to the process 400a are explained in more detail with respect to FIGS. 1-5. Depending on the embodiment, the process 400a may include fewer or additional blocks, and the blocks may be performed in an order that is different than illustrated.

At block 401a, the CDS 200a obtains information indicating groupings of data of a data source 210. The data may be stored in one or more files or databases in the data source 210. The information can indicate a number of data items included in each of the groupings. The groupings can be based on timestamps of respective data items. The timestamps can indicate respective times at which data items were last updated. In certain embodiments, the timestamps of the respective data items include the date and the time at which the respective data items were last updated, and the groupings are based on only the date of the timestamps of the respective data items. For example, a grouping operation is performed based on only the date of the timestamps associated with the data items. In such case, each grouping is associated with a specific date. In some embodiments, the groupings are based on field of respective data items that can provide an uneven distribution of data items included in each grouping.

The CDS 200a may obtain the information indicating the groupings of the data at an interval. The CDS 200a may also obtain the information indicating the groupings of the data in response to receiving a request from a destination system 270. The CDS 200a may obtain information indicating the groupings of the data stored in one or more files in the data source 210 using a first adapter. The CDS 200a may obtain information indicating the groupings of the data stored in one or more databases in the data source 210 using a second adapter. The first adapter and the second adapter may be different.

At block 402a, the CDS 200a determines a grouping whose data items have changed. The CDS 200a can determine whether data items of a grouping have changed by comparing a number of data items included in the grouping and a historical number of data items included in a corresponding local version of that grouping. The corresponding local version of the first grouping may be created based on data items included in the grouping at a time prior to obtaining the information indicating the groupings of the data. This time may be referred to as time T0.

At block 403a, the CDS 200a obtains data items in the changed grouping from the data source 210. A data item included in the grouping can be a row in the one or more databases of the data source 210 or a line in the one or more files in the data source 210. In certain embodiments, if the data source 210 includes one or more files, the CDS 200a can check the timestamp of a file and compare it to the timestamp of the previous version of the file in order to determine whether the file may include new data. By comparing the timestamps of the current file and the previous version of the file, the CDS 200a does not need to parse through the data in the file to determine whether new data has been added. In such embodiments, the CDS 200a may not obtain grouping information. In addition, with respect to blocks 402a and 403a, the CDS 200a can directly compare the data items in the current file and the data items in the previous version of the file, instead of determining changed grouping(s) and/or obtaining the data items in the changed grouping from the data source 210.

At block 404a, the CDS 200a compares data items in the grouping with the data items of the corresponding local version of the grouping. By comparing the data items, the CDS 200 can determine which data items of the grouping from the data source 210 have changed. The corresponding local version of the grouping can include a copy of the data items included in the grouping at T0. In certain embodiments, where the data source 210 includes one or more files, the CDS 200a can treat each newline in the file as a data item and compare the data items in the current file and the data items in the previous version of the file to identify the changed data items.

At block 405a, the CDS 200a extracts the changed data items of the grouping. The CDS 200a can forward the extracted changed data items to one or more destination systems 270.

If the number of data items included in the grouping is higher than the historical number of data items included in the corresponding local version of the grouping, the CDS 200a can identify the changed data items as added or updated data items, and forward the changed data items to the destination system 270 to be stored. If the number of data items included in the grouping is lower than the historical number of data items included in the corresponding local version of the grouping, the CDS 200a can identify the changed data items as deleted data items, and forward the changed data items to the destination system 270 to be removed.

In some embodiments, the CDS 200a assigns a unique identifier to each of the data item included in the grouping. The CDS 200a can determine whether a changed item is a new data item or an updated data item based on the unique identifier associated with the changed data item.

Figure 4B:
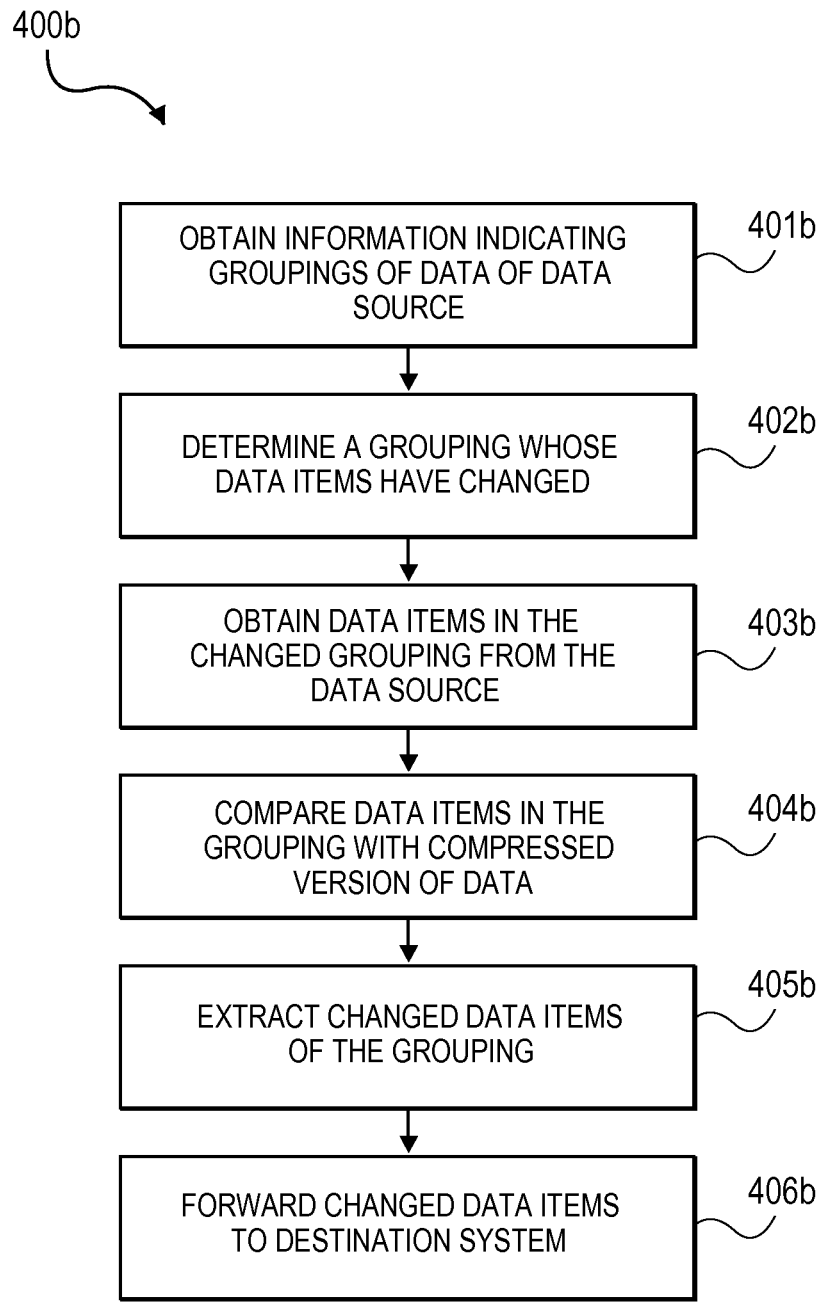
FIG. 4B is a flowchart illustrating another embodiment of a process for determining and obtaining changes in data of a plurality of data sources.
Figure 5:
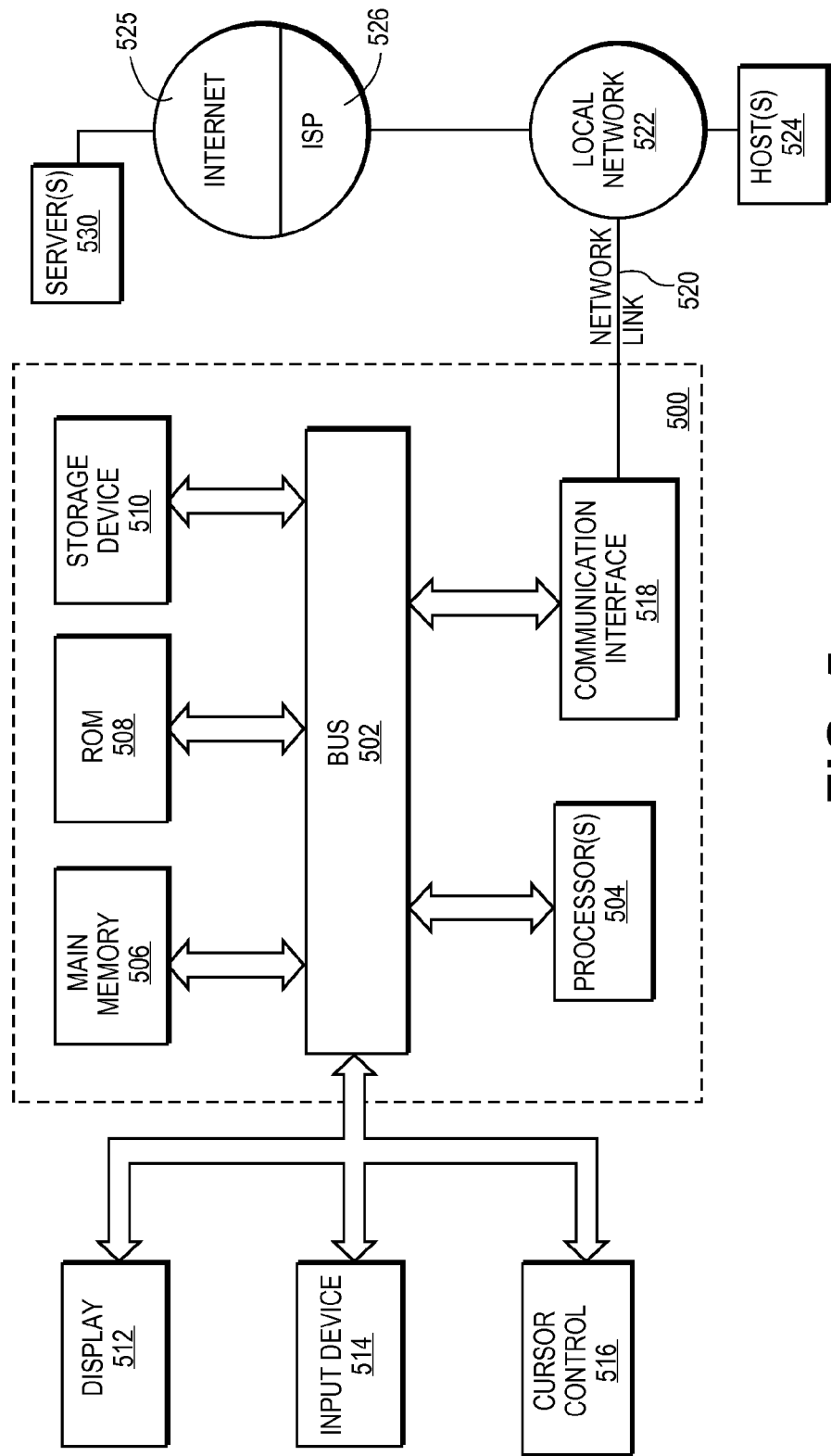
FIG. 5 is a block diagram illustrating a computer system with which certain methods discussed herein may be implemented.

FIG. 4B is a flowchart illustrating another embodiment of a process 400b for determining and obtaining changes in data of a plurality of data sources. The process 400b may be implemented by one or more systems described with respect to FIGS. 1-2 and 5. For illustrative purposes, the process 400b is explained below in connection with the CDS 200b in FIG. 2B. Certain details relating to the process 400b are explained in more detail with respect to FIGS. 1-5. Depending on the embodiment, the process 400b may include fewer or additional blocks, and the blocks may be performed in an order that is different than illustrated.

At block 401b, the CDS 200b obtains information indicating groupings of data of a data source 210. The data source 210 may be a database or a file. The information can indicate a number of data items included in each of the groupings. The groupings can be based on timestamps of respective data items. The timestamps can indicate respective times at which data items were last updated.

At block 402b, the CDS 200b determines a grouping whose data items have changed. The CDS 200b can determine whether data items of a grouping have changed by comparing a number of data items included in the grouping and a historical number of data items included in each of the groupings. For example, the historical number of data items included in each of the groupings may be stored in historical grouping data 315 discussed with respect to FIG. 3.

At block 403b, the CDS 200b obtains data items in the changed grouping from the data source 210. If the data source 210 is a database 210a, a data item included in the grouping can be a row, and if the data source 210 is a file 210b, a data item included in the grouping can be a line.

At block 404b, the CDS 200b compares data items in the grouping with a compressed version of the data. The CDS 200b can compare the data items in the grouping with a corresponding local version of the grouping, which can be a compressed version of the data. Based on the comparison, the CDS 200b can determine which data items of the grouping from the data source 210 have changed. The compressed version of the data may be a space-efficient probabilistic data structure, such as a Bloom filter. The space-efficient probabilistic data structure may include information about data items included in the grouping at a time prior to obtaining the information indicating the groupings of the data of the data source 210. This time may be referred to as time T0. The space-efficient probabilistic data structure can identify whether a data item included in the grouping was included in the grouping at the prior time (e.g., time T0). In some embodiments, the space-efficient probabilistic data structure is a Bloom filter. The Bloom filter may be selected from multiple Bloom filters each having a different size. The compressed version of the data may not comprise a copy of the grouping.

The compressed version of the data is stored on local storage 250b, and the extracted changed data items forwarded to the destination system 270 are stored on storage in the destination system 270. In certain embodiments, the local storage 250b has a smaller storage capacity than the destination system 270 storage. In one embodiment, the local storage 250b includes NAS.

At block 405b, the CDS 200b extracts the changed data items of the grouping. At block 406b, the CDS 200b forwards the changed data items to the destination system 270. Blocks 405b and 406b can be similar to blocks 405a in FIG. 4A.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 8 is a block diagram that illustrates a computer system 500 upon which an embodiment may be implemented. For example, the computing system 500 may comprises a server system that accesses law enforcement data and provides user interface data to one or more users (e.g., executives) that allows those users to view their desired executive dashboards and interface with the data. Other computing systems discussed herein, such as the user (e.g., executive), may include any portion of the circuitry and/or functionality discussed with reference to system 500.

Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 808 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 525. Local network 522 and Internet 525 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 525, ISP 526, local network 522 and communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to obtain changed data from a data source, the computer system comprising:
   one or more hardware computer processors configured to execute software code stored in a tangible storage device in order to cause the system to:
      obtain information indicating a plurality of groupings of data stored in one or more files or databases in a data source, the information indicating a number of data items included in each of the plurality of groupings;

determine a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data;

access data items included in the first grouping from the data source;

compare the data items included in the first grouping to data items of the corresponding local version of the first grouping to determine which data items of the first grouping from the data source have changed;

extract the changed data items of the first grouping; and forward the extracted changed data items to a destination system.

2. The system of claim 1, wherein the plurality of groupings is based on timestamps of respective data items, wherein the timestamps indicate respective times at which data items were last updated.

3. The system of claim 2, wherein the timestamps of the respective data items include a date and a time at which the respective data items were last updated, and wherein the plurality of groupings is based on only the date of the timestamps of the respective data items.

4. The system of claim 3, wherein each of the plurality of groupings is associated with a different date.

5. The system of claim 3, wherein the dates associated with each of the plurality of groupings are within a range of dates.

6. The system of claim 1, wherein the plurality of groupings is based on a first field of respective data items, the first field configured to provide an uneven distribution of data items included in each of the plurality of groupings.

7. The system of claim 1, wherein the corresponding local version of the first grouping comprises a copy of the data items included in the first grouping at the first time.

8. The system of claim 1, wherein, in response to determining that the first number of data items is higher than the historical first number of data items, the code is further configured to cause the system to:

identify the changed data items as added or updated data items; and forward the changed data items to the destination system to be stored.

9. The system of claim 1, wherein, in response to determining that the first number of data items is lower than the historical first number of data items, the code is further configured to cause the system to:

identify the changed data items as deleted data items; and forward the changed data items to the destination system to be removed.

10. The system of claim 1, wherein the code is further configured to:

assign a unique identifier to each of the data items included in the first grouping; and determine whether a first changed data item of the changed data items is a new data item or an updated data item based on the unique identifier associated with the first changed data item.

11. The system of claim 1, wherein a data item included in the first grouping is a row in the one or more databases or a line in the one or more files.

12. The system of claim 1, wherein the code is further configured to cause the system to:

obtain the information indicating the plurality of groupings of the data stored in the one or more files in the data source using a first adapter; and obtain the information indicating the plurality of groupings of the data stored in the one or more databases in the data source using a second adapter.

13. The system of claim 1, wherein the code is further configured to cause the system to obtain the information indicating the plurality of groupings of the data at an interval.

14. The system of claim 1, wherein the code is further configured to cause the system to obtain the information indicating the plurality of groupings of the data in response to receiving a request from the destination system.

15. A method of obtaining changed data from a data source, the method comprising:

obtaining, by one or more hardware computer processors, information indicating a plurality of groupings of data stored in one or more files or databases in a data source, the information indicating a number of data items included in each of the plurality of groupings;

determining, by the one or more hardware computer processors, a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data;

accessing, by the one or more hardware computer processors, data items included in the first grouping from the data source;

comparing, by the one or more hardware computer processors, the data items included in the first grouping to data items of the corresponding local version of the first grouping to determine which data items of the first grouping from the data source have changed;

extracting, by the one or more hardware computer processors, the changed data items of the first grouping; and forwarding, by the one or more hardware computer processors, the extracted changed data items to a destination system.

16. The method of claim 15, wherein the plurality of groupings is based on timestamps of respective data items, wherein the timestamps indicate respective times at which data items were last updated.

17. The method of claim 15, wherein the plurality of groupings is based on a first field of respective data items, the first field configured to provide an uneven distribution of data items included in each of the plurality of groupings.

18. The method of claim 15, wherein the corresponding local version of the first grouping comprises a copy of the data items included in the first grouping at the first time.

19. The method of claim 15, wherein a data item included in the first grouping is a row in the one or more databases or a line in the one or more files.

20. A non-transitory computer readable medium comprising instructions for obtaining changed data from a data source that cause a computer processor to:

obtain information indicating a plurality of groupings of data stored in one or more files or databases in a data source, the information indicating a number of data items included in each of the plurality of groupings;

determine a first grouping of the plurality of groupings including one or more data items that have changed by comparing a first number of data items included in the first grouping and a historical first number of data items included in a corresponding local version of the first grouping, wherein the corresponding local version of the first grouping is created based on data items included in the first grouping at a first time prior to said obtaining the information indicating the plurality of groupings of the data;

access data items included in the first grouping from the data source;

compare the data items included in the first grouping to data items of the corresponding local version of the first grouping to determine which data items of the first grouping from the data source have changed;

extract the changed data items of the first grouping; and forward the extracted changed data items to a destination system.

* * * * *